Oct. 13, 1942.  G. KINER  2,298,487
CREDIT-AUTHORIZATION TELEPHONE SYSTEM
Filed April 17, 1941   3 Sheets-Sheet 1

Inventor:
Glenn Kiner.
By C.P.S.
Atty.

Oct. 13, 1942.   G. KINER   2,298,487
CREDIT-AUTHORIZATION TELEPHONE SYSTEM
Filed April 17, 1941   3 Sheets-Sheet 2
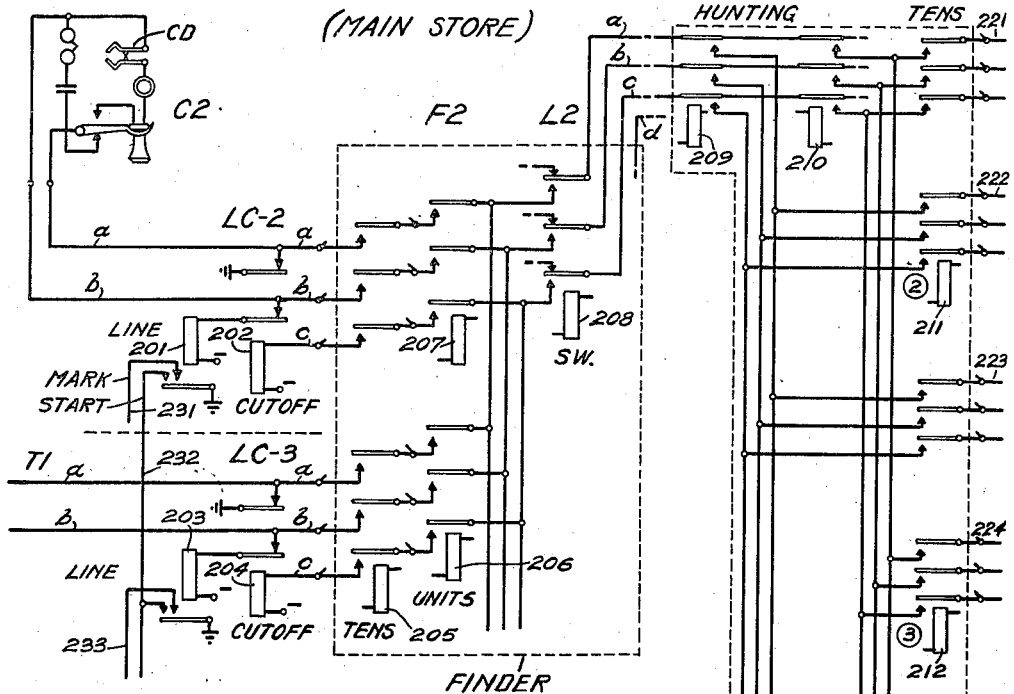
Fig. 2.
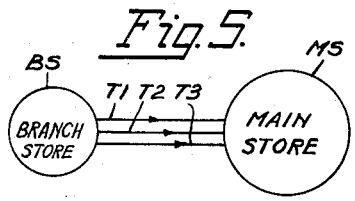
Fig. 5.
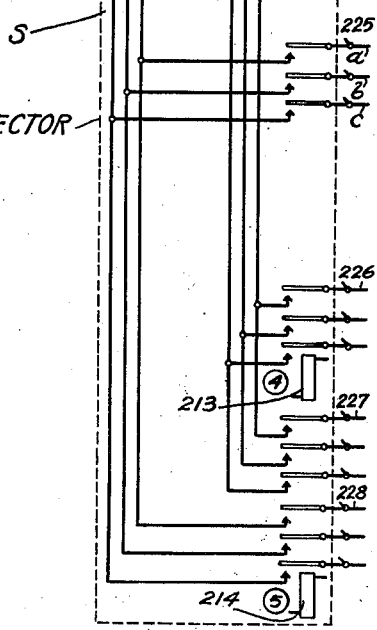
Inventor
Glenn Kiner.
By C. C. S.
Atty.

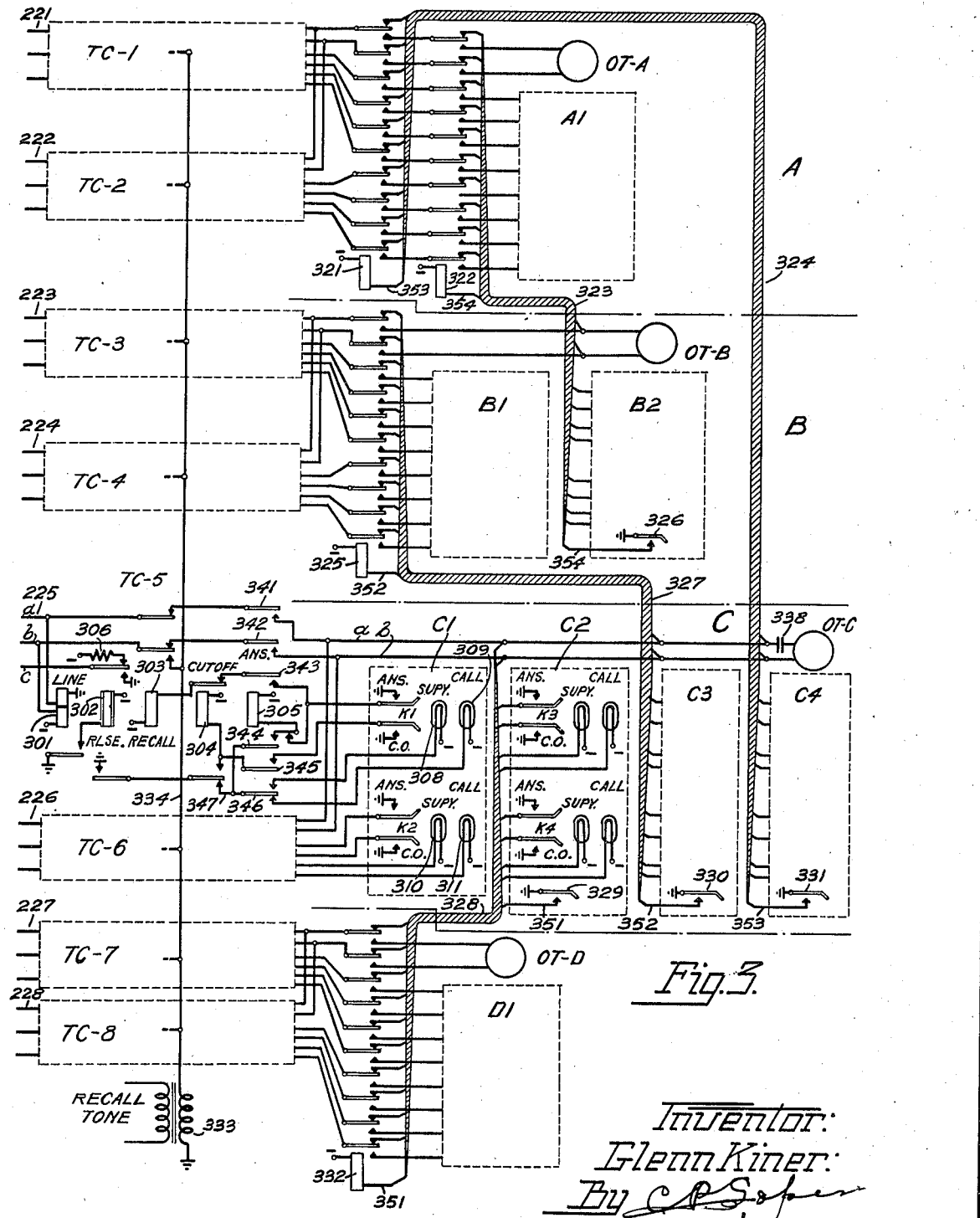

Patented Oct. 13, 1942

2,298,487

UNITED STATES PATENT OFFICE 2,298,487

CREDIT-AUTHORIZATION TELEPHONE SYSTEM

Glenn Kiner, Markham, Ill., assignor to Kellogg Switchboard and Supply Company, Chicago, Ill., a corporation of Illinois Application April 17, 1941, Serial No. 389,011

8 Claims. (Cl. 179—2)

This invention relates to credit-authorization telephone systems, and the object of the invention is to provide a telephone system especially suitable for the efficient dissemination of credit information from a central source.

General description

It is a rather general practice in the operation of large department stores and similar retail establishments to provide a number of complete card files of the regular customers, indicating the respective credit ratings of such customers, and to provide a telephone system enabling the clerks to communicate with operators at the files to determine the respective credit ratings of the customers currently requesting credit on current purchases. Such a system is commonly called a credit-authorization system.

Credit-authorization systems as heretofore used have been somewhat cumbersome and inefficient, because the attendants or operators who answer the credit calls from the clerks have heretofore had to be each provided with a complete file of all of the customers, which files are rather large and expensive in the case of a large establishment with many customers. In previous systems any file operator has been required to be in a position to answer a request for information as to any customer, and has thus been required to have a complete file at her disposal. Additionally, since a request for credit information received by any one credit operator could concern any one of a large number of customers, a great deal of time has heretofore been consumed in getting this information from a large complete file.

A feature of this invention is that only one credit file is provided for all the credit operators, and each operator having only a single portion of this file assigned to her.

A further feature, related to the foregoing, is that the credit-authorization telephone system is arranged so that the store clerk desiring credit information is enabled to extend a connection selectively to the telephone of the particular credit operator having charge of the portion of the file containing the desired credit information. By virtue of this arrangement, each credit operator receives only calls requesting information as to customers listed in the portion of the file assigned to her, whereby one complete file serves for as many operators as may be required, and the efficiency of each operator is enhanced by the reduced amount of file material through which she must search for the desired information.

A further feature of the invention is that the credit-authorization file at a main store is used to supply credit information on the same basis to clerks at the main store, and to clerks at a remotely located branch store, telephone circuits being provided to enable clerks in the branch store to cause a connection to be extended to a desired credit operator in the main store.

The drawings

Referring now to the accompanying drawings, comprising Figures 1 to 5, they show a sufficient amount of the equipment in a credit-authorization telephone system embodying the features of the invention to enable the invention to be understood.

Figures 1 to 3 are circuit drawings, while Figures 4 and 5 are illustrative of the physical equipment and of the inter-store connections.

Figure 1 shows equipment in the branch store, including the clerk's telephone C1, connected by the associated telephone line to the individual line circuit LC—1, from which it can be extended by way of, for example, the illustrated finder F1, the repeater R, and the trunk T1 to the main store;

Figure 2 shows equipment in the main store including the clerk's telephone C2, the line circuits LC—2 and LC—3, individual respectively to the illustrated clerk's telephone line and the trunk T1, from which connections may be extended by way of, for example, the finder F2 and the selector S, to an idle trunk in a desired one of four groups extending to the credit operator's switchboard;

Figure 3 shows the trunks 221 to 228, comprising four groups, incoming from the selectors to the credit switchboard, together with the terminating trunk circuits, TC—1 to TC—8, and the switchboard equipment at positions A to D;

Figure 4 shows the credit switchboard 400, comprising operator's positions A to D, together with credit files CF—1 to CF—4 located respectively at positions A to D; and Figure 5 indicates the branch store BS and the main store MS interconnected by three trunk lines T1, T2, and T3, extending from the branch store BS to the main store MS, the trunk line T1 being the one shown in Figures 1 and 2.

The general arrangement

Figure 4:
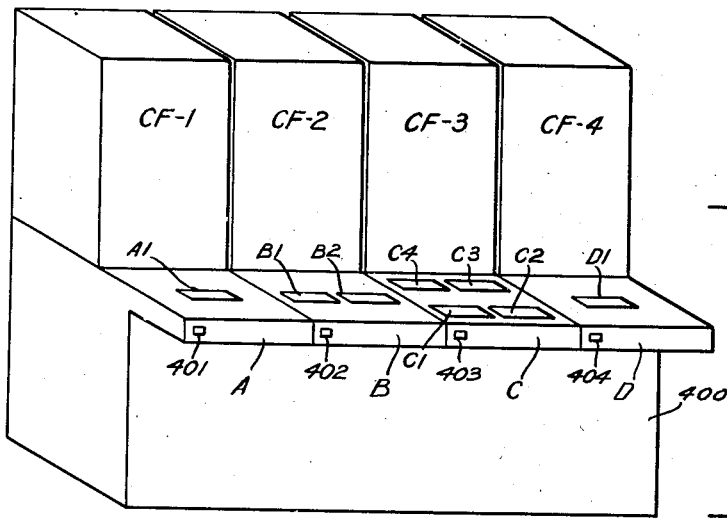

Referring now particularly to Figure 4, it is observed that the credit files CF—1 to CF—4 are resting on the back portion of the switchboard 400 so as to be faced respectively by four operators when located respectively at positions A to D. The switchboard arrangement is such that four operators (one for each of the positions) are used to handle the peak requirements for credit information, such as arises when the store has advertised a special sale, or during the holiday buying season. At this time the operator at position A uses key and lamp equipment indicated at A1; the operator at position B uses the key and lamp equipment B1; the operator at position C uses the key and lamp equipment C1; and the operator at position D uses the key and lamp equipment D1. The rectangles 401 to 404 indicate, respectively, the location of the jack equipment used to enable the operators' telephones at positions A to D to be connected and disconnected.

When the credit-information demand is somewhat less, and such that it can be handled by two credit operators, positions B and C only are attended, at which time transfer switching arrangements, hereinafter described, are actuated to cause the calls which normally come in on operator's equipment A1 and associated telephone to come in at operator's equipment B2 and associated telephone, enabling the operator at position B to handle calls incoming to the A and B positions and to give credit information contained in the credit files CF—1 and CF—2. Similarly, the said transfer switching arrangements are employed to enable the operator's equipment C2 at position C, to take over the work of the operator's equipment at D1 of position D to enable the operator at position C to receive calls for both positions C and D and to give out credit information contained in the files CF—3 and CF—4.

During a time when the requests for credit information are slack, the previously mentioned transfer switching arrangements can be operated to cause all calls for the four positions to come in at position C. At this time, equipment C1 handles the calls normally directed to position C; equipment C2 receives the calls normally directed to position D; equipment C3 handles calls normally directed to position B; and equipment C4 receives the calls normally directed to position A. The single operator at position C separately receives the four classes of calls directed to the switchboard, and can give out the information from the respectively concerned ones of the credit files CF—1 to CF—4.

For the purpose of extending connections to the equipment of the credit operators a sufficient number of finder-selector links to handle the traffic are provided, one of which is link L2, Figure 2. The link L2 extends to the selector S, from the finder F2, having access to all of the clerk's lines in the main store and to the trunks, such as T1, incoming to the main store from the branch store. The selector S is arranged to respond to a single-digit number indicative of which of the credit files CF—1 to CF—4, Figure 4, contains the desired information, to thereby select a corresponding group of trunks, and to thereafter search for, and connect with, an idle trunk in the selected group. The trunk group comprising trunks 221 and 222 is one such group, being selected by tens relay 211 when the seizure of the selector S is followed by the dialing of the digit 2. One or the other of these trunks, if one of them is idle, is selected by the hunting relays 209 and 210, to thereby extend a connection, to a trunk circuit, such as TC—1 and TC—2, to bring in a signal at the credit switchboard indicating that information contained in credit file CF—1 is desired.

If the seizure of the selector S is followed by the dialing of the digit 3, tens relay 212 operates to cause one of the trunks 223 and 224 to be seized to extend a connection to the credit switchboard and to bring in a signal indicative of the fact that information in credit file CF—2, Figure 4, is desired. Similarly, tens relays 213 and 214 are respectively responsive to the digits 4 and 5 to cause selection of the associated trunk groups to extend connections to the credit switchboard indicative respectively that information in credit files CF—3 and CF—4 is desired.

Fig illustrative purposes it may be assumed that assignment of credit information and of telephone numbers to the credit files CF—1 to CF—4 of Figure 4 is as given in the following assignment table:

*Assignment table*

| Customer's street No. | Credit file | Assigned tel. No. |
|---|---|---|
| 1 to 1500 | CF-1 | 2 |
| 1501 to 3000 | CF-2 | 3 |
| 3001 to 4500 | CF-3 | 4 |
| 4501 up, and rural | CF-4 | 5 |

As denoted in the above table, if the customer requesting credit has a street number (regardless of what street or what city) of from 1 to 1500, the information (if available) as to that customer's credit is found in credit file CF—1, to which the telephone number 2 is assigned. Similarly, the credit information compiled for all customers having street numbers from 1501 to 3000 is contained in credit file CF—2 to which the telephone number 3 is assigned; the credit information compiled for all customers having street numbers from 3001 to 4500 is contained in credit file CF—3 to which the telephone number 4 is assigned; and the credit information compiled for all customers having a street number of 4501 and higher, and for all rural customers, is contained in credit file CF—4, to which the telephone number 5 is assigned. It is contemplated that the information in the above assignment table be posted throughout the stores in proximity to the clerks' telephones to enable a clerk to dial the correct one of the assigned numbers when desiring credit information. By this arrangement the calls for credit information come in to the credit switchboard over the respective trunk groups indicative of the files containing such information.

The operators' equipment groups shown in Figure 4 (group A1 at position A, groups B1 and B2 at position B, groups C1 to C4 at position C, and group D1 at position D) are indicated in the portion of the circuit diagram shown in Figure 3. The equipment group C1 is associated with the trunk circuits TC—5 and TC—6, reached by the dialing of the digit constituting the telephone number 4. This group includes the answer and cutoff key K1 and the supervisory and call lamps 308 and 309, associated with the trunk circuit TC—5, together with similar key and lamp equipment associated with the trunk circuit TC—6.

The equipment group C—2 includes the illustrated key and lamp equipment similar to that of the equipment group C1, and it includes also a switching key 329 which can be actuated by the operator at position C when she desires that transfer relay 322 associated with position 4 be operated to transfer the trunk circuits TC—7 and TC—8 (corresponding to telephone number 5 and associated with credit file CF—4) to the equipment DI at position D. Equipment DI is like equipments AI, BI, and CI, while equipments B2, C2, C3, and C4 are all alike in that each of the latter is provided with a transfer key.

DETAILED DESCRIPTION

The invention having been described generally, a detailed description of the operation of the apparatus shown will now be given.

*Calling credit file CF—3*

Let it be assumed that the clerk at the clerk's telephone C2, Figure 2, at the main store, is making a sale to a credit-requesting customer whose street number is some number from 3001 to 4500, the street number 4150 for example. By reference to the previously given assignment table, it is apparent that the information as to customer's credit is contained in credit file CF—3 (associated with position C of the switchboard), and that the telephone number assigned to this file is the telephone number 4. Accordingly, the clerk removes the receiver at the clerk's phone C2 and dials the digit 4.

When the receiver is removed at substation C2, the hook switch contacts close a bridge across the conductors *a* and *b* of the associated line, through the receiver, transmitter, and contacts of the calling device CD in series (the telephone circuit being illustrated as of the simple series type). When this occurs line relay 201 of the line circuit LC—2 operates over the calling line, through contacts of cutoff relay 202. Upon operating, line relay 201 places ground potential on the individual marking conductor 231 to mark the associated line to enable it to be found by the currently allotted finder, and it places ground potential on the start conductor 232 to start the currently allotted finder to make connection with the calling line by way of the *a*, *b*, and *c* leads shown in association with the line circuit LC—2.

It will be understood, of course, that any suitable type of finder mechanism and finder control circuit may be employed, but, because the switching equipment is usually unattended, all-relay finder and selector switches are preferred.

It may be assumed that the finder F2, associated with the link L2 and the selector S, is the one currently allotted when the receiver is removed at substation C2. That being the case, by virtue of the grounding of the mark and start leads 201 by line relay 202, the finder F2 is caused to extend the link L2 to the conductors *a*, *b*, and *c* of the line circuit LC—2. This is accomplished by an energization of the tens relay 205 to connect up the line circuits LC—2 and the others in the same tens group, and energization of units relay 207 (being one of five such units relays) with only five units relays provided, the final selection of the calling one of the ten lines selected by the tens relay is ordinarily accomplished by a units-switching relay 208, which operates or not, depending upon whether the line calling is in the first or second group of five lines group denoted by energization of a tens relay. In the present case, relay 208 is actuated, and the *a*, *b*, and *c* leads associated with the line circuit LC—2 are extended through the uppermost three contact pairs of tens relay 205, the three illustrated contact pairs of units relay 207, and through contacts of the actuated units-switching relay 208 to the *a*, *b*, and *c* leads of the link L2. The *d* lead shown as included in the link L2 is the one ordinarily used to maintain locking circuits for relays such as 205 to 208 of the finder.

It will be observed that a portion of the conductors of the link L2 extending from the finder F2 to the selector S is broken or dotted. This indicates that the usual relay mechanism of a selector S is actually present and included at this portion of the link, but such relay mechanism, being well known, has been omitted to avoid undue complication.

When the connection is made as above noted, through contacts of the operated relays 205 to 208, ground potential is returned on the *c* lead of the link L2 from the control relays (not shown) the selector S to close a circuit through contacts of the operated relays 208, 207, and 205 and over the *c* lead of the line circuit LC—2 for cutoff relay 202. The return of this ground potential is ordinarily facilitated by the closure of a temporary circuit for the line relay of the selector from the finder-allotter to cause the line release relays of the selector to operate immediately to prepare for the operation of the cutoff relay as soon as the finder has connected with the calling line.

When it operates relay 202 disconnects the winding of line relay 201 from the *b* conductor of the calling line, and it disconnects ground potential from the *a* conductor of the calling line. When this occurs, line relay 201 restores and removes ground potential from the mark and start conductor 231 and 232, causing the finder-allotter (not shown) to move away from the finder F to allot the next idle finder. From this point, the line relay of the selector is maintained actuated over the calling line and maintains the associated slow-acting release relay operated to maintain a holding and guarding ground potential on the *c* lead, thereby maintaining cutoff relay 202 operated.

When the calling subscriber dials the number 4, assigned to the credit file CF—3, four interruptions are produced at the illustrated impulse contacts of the calling device CD during the return to normal position of the actuated dial thereof, causing four momentary restorations of the line relay (not shown) of the selector S. This results in the usual manner in the energization of the number 4 selecting relay 213. Relay 4, upon operating, connects up trunks 225 and 226 leading to the trunk circuits TC—5 and TC—6 assigned to the credit file CF—3.

The operation of relay 4 to connect up trunks 225 and 226 is followed by a hunting operation, resulting in the energization of one or the other of the hunting relays 209 and 210 to select an idle one of the connected trunks and make connection thereto. It may be assumed that the trunk 225 is idle and that hunting relay 209 operates to connect the *a*, *b*, and *c* leads of the link L2 to the corresponding leads of trunk 225, through the uppermost contact set if relay 213, in which case hunting relay 210 does not operate.

In the selector S, the usual switching relay (not shown) may now extend the *a*, *b*, and *c* leads of the link L2 through the selector S to the corresponding conductors of the trunk 225, extending to the trunk circuit TC—5, Figure 3.

In the trunk circuit TC—5, the double wound line relay 301 now operates over the associated a and b conductors of the trunk 225, to which the a and b conductors of the line associated with the clerk's telephone C2 have now been respectively extended. Upon operating, line relay 301 closes a circuit for the associated slow-restoring release relay 302. Relay 302 now operates and disconnects the associated c lead from the idle-indicating, battery-supply resistor 306 and connects it to ground. As is well known, this operation occurs to provide a new supply of holding and guarding ground potential to the extended c lead before the release relay (not shown) of the selector S has fallen back.

At its lower armature, release relay 302 applies ground potential, through contacts of the non-operated relay 304, to conductor 347, thereby closing a circuit through armature 346 and its resting contact for call lamp 309. Lamp 309 thereupon becomes lighted to signal the operator at position C that a call has arrived on the trunk circuit TC—5 for credit information contained in the credit file CF—3.

The operator at position C may now momentarily manipulate the combined answer and cutoff key K1 so as to close the upper or answer contacts thereof, thereby closing a circuit, through contacts controlled by armature 344, for relay 305. Relay 305 thereupon operates and closes a local locking circuit for itself at armature 344, which includes the now-grounded conductor 347, at the same time opening its initial energizing circuit.

At armature 343 relay 305 connects up recall relay 303, through contact of relay 304, to the answer portion of the key K1, but relay 303 is operated only momentarily, if at all, at this time, because the key K1 is only momentarily manipulated to secure operation of answer relay 305.

At armature 345, relay 305 prepares a circuit for cutoff relay 304; at armatures 341 and 342, it extends the incoming a and b conductors to the a and b leads of the position-C operator's telephone circuit OT—C; and at armature 346 it extinguishes the call lamp 309 and lights the supervisory lamp 308.

The operator at position C may now converse, through her telephone OT—C and over the established connection, with the clerk at the telephone C1.

Upon being apprised of the name and specific address of the customer requesting credit, the operator may refer to the concerned credit file CF—3, Figure 4, and then inform the clerk at the telephone C1 that the credit is authorized, or is refused, depending upon the information found in the file CF—3.

Supervisory lamps such as 308 and 310 are useful principally to indicate to the operator that her head set conductors are connected with one of the trunk circuits and that she should not actuate a further key to answering position until the supervisory light associated with the previously established connection has been extinguished, in the manner to be pointed out.

The operation which takes place at the end of the conversation depends upon whether the clerk at the telephone C1 replaces the receiver immediately, or delays to do so. If the clerk replaces the receiver immediately, the connection is quickly cleared out as the result thereof and the operator at position C need do nothing to free her telephone OT—C for the answering of other calls.

This clear-out of the connection occurs as follows:

When the line relay 301 of TC—5 restores, responsive to the replacement of the receiver at substation C1, it opens the circuit of release relay 302, with the result that release relay 302 shortly restores. At its lower armature, relay 302 removes ground potential from conductor 337, thereby extinguishing supervisory light 308 to indicate to the operator that the connection has been cleared out, and opening the locking circuit of answer relay 305. Relay 305 thereupon restores, disconnecting the talking conductors of trunk 225 from telephone OT—C at armatures 331 and 332, and bringing the trunk circuit TC—5 into normal condition.

In the meantime, the restoration of the upper armature of release relay 302 results in the removal of ground potential from the associated c lead, and in the application of an idle-connecting potential thereto, through resistor 306, to mark trunk 225 as an idle trunk.

The usual relay action now takes place in the selector S to permit the actuated relays 209 and 213 therein to restore, and to otherwise clear out the selector. As the same time, the energized tens, units, and units-switching relays 205, 207, and 208 are restored in the usual manner as the finder F2 clears out.

In the line circuit LC—2 the removal of ground potential from the extended c lead permits cutoff relay 202 to restore, thereby reconnecting line relay 201 and ground potential to the conductors of the associated line.

Assuming now that supervisory lamp 308 remains lighted after the conversation has been terminated, the operator at position C is thereby apprised that the calling clerk has not replaced her receiver to cause the connection to be cleared out as above described, and that the operator's telephone OT—C has not been freed.

In order to free her telephone OT—C to permit another call to be answered, the operator may manipulate the combined answer and cutoff key K1 in the opposite direction, thereby closing temporarily the lower or cutoff contacts thereof. A circuit is thus temporarily closed, through the actuated armature 345 of answer relay 305, for cutoff relay 304. Relay 304 thereupon operates. At its lower armature it closes a local locking circuit for itself, through the lower contacts of the actuated release relay 302, at the same time disconnecting ground potential from conductor 337. When this occurs the supervisory light 308 is extinguished, and the answer relay 305 is unlocked and restored, to disconnect the operator's telephone OT—C at armatures 341 and 342 from the trunk circuit TC—5.

Cutoff relay 304 remains operated and locked through contacts of release relay 302 until that relay becomes restored, responsive to the restoration of line relay 301 when the calling clerk eventually replaces her telephone receiver to cause the connection to clear out as described.

When a call comes in over trunk 226 to trunk circuit TC—6, a duplicate of trunk circuit TC—5, relay operation as described in connection with the trunk circuit TC—5 occurs in the trunk circuit TC—6 to bring about the lighting of the call lamp 311 associated therewith. The operator may thereupon throw her key K2 to answering position to cause the incoming talking conductors to be connected to the operator's telephone OT—C, through blocking condenser 338. At this time, call lamp 311 becomes extinguished and supervisory lamp 310 lights.

Recall operation

Arrangements are provided enabling a clerk who is temporarily unable to have her call completed at the credit switchboard, because the operator thereat is busy, to be recalled in the event that the clerk temporarily leaves her telephone to attend to her duties while she waits for the response of the called credit operator. Under the conditions discussed, the clerk does not replace the receiver but leaves the receiver off the hook while performing her other duties.

Assuming that the call under discussion is one which has been extended from the clerk's telephone C2, Figure 2, by way of the finder F2 and selector S to the trunk circuit TC—5, the call lamp 309 in the equipment C1 is lighted (as before described) over a circuit extending from the ground at the lower contacts of the actuated release relay 302, through the lower armature of relay 304 and its resting contact, to conductor 347, and thence by way of armature 346 of answer relay 305 and its resting contact, to the lamp 309.

When the operator at position C finishes with the credit call which she is currently handling, she may temporarily actuate the key K1 to answering position, thereby closing a circuit as previously described for answer relay 305, through the normally closed contacts controlled by armature 344. Answer relay 305 operates as previously described to connect up the talking conductors of the trunk circuit TC—5 to the operator's telephone OT—C at armatures 341 and 342, and to lock itself to the grounded conductor 347 at armature 344, at the same time extinguishing call lamp 309 at armature 346, and lighting the supervisory lamp 308.

Since the clerk at the calling telephone C2 has left the telephone to attend to her other duties the operator at position C receives no answer when she attempts to converse with the calling clerk. Under this condition, the operator again throws the key K1 to answer position to close the upper contacts thereof, but at this time she leaves the key K1 in answer position for an appreciable length of time to thereby effect the transmission of a recall signal back over the established connection to the receiver at the calling telephone. This recall signal is transmitted by the operation of recall relay 303.

With answer relay 305 operated, the reoperation of the key K1 to answer position closes a circuit through contacts of the actuated armature 343, and through contacts of the non-operated cutoff relay 304, to operate recall relay 303. When the recall relay 303 operates, it temporarily breaks the extended talking connection at its two illustrated armatures and their back contacts, while at its inner armature and front contact, it extends the incoming b talking conductor of the trunk 225 to the common recall-tone conductor 334, connected with the recall-tone transformer 333. The recall-tone current is thus extended over the b conductor of the established connection to the calling telephone C2, and passes through the receiver thereat, returning over the a lead of the established connection, to ground through the upper winding of line relay 301. The recall-tone source is preferably such that the recall tone is now clearly audible through the receiver at the calling substation to inform the clerk that she is being recalled to the telephone and that the credit operator is now ready to give her the desired information.

When the key K1 is restored from its actuated position, recall relay 303 restores and disconnects the incoming b lead from the recall-tone conductor 334, and again closes the talking leads.

The clerk and the operator at position C may now converse as desired.

After the credit information has been given, the established connection is cleared out in the manner previously set forth.

All positions attended

Let it be assumed now that four operators are in attendance at the switchboard illustrated in Figure 4, at the positions A to D, respectively. Under this condition, the operator at the master position C answers only the calls coming in over the group-4 trunks, leading to the trunk circuits TC—5 and TC—6. The transfer control keys 329, 330, and 331 in the equipments C2, C3, and C4, respectively, are therefore actuated to cause calls arriving on other trunk groups, associated respectively with the credit files at the other positions, to come in at such other positions. The actuation of transfer-control key 329 grounds conductor 341 in cable 328, thereby operating transfer relay 332. Relay 332 thereupon disconnects the switchboard conductors associated with the group-5 trunk circuits, TC—7 and TC—8, from the equipment unit C2, at position C, and transfers them to the equipment unit D1, at position D.

Similarly, transfer control key 330 grounds conductor 352 in cable 327 to thereby actuate transfer relay 325 to transfer the switchboard conductors associated with the group-3 trunk circuits TC—3 and TC—4 from equipment unit C3, at position C, to the equipment unit B1, at position B. By this operation, calls coming in over trunks TC—3 and TC—4 for information in credit file CF—2, Figure 4, are received at position B on the key and lamp equipment B1.

The operation of transfer key 331 grounds conductor 353 in cable 324, thereby actuating transfer relay 321 to transfer the switchboard conductors associated with the group-2 trunk circuits TC—1 and TC—2 of the No. 2 group away from the operator's key and lamp equipment C4 at position C to the equipment A1 at position 1, or to the equipment B2 at position B, depending upon whether transfer relay 322 is in a restored condition or is actuated. Under the conditions now assumed, the transfer-control key 326 at equipment B2 is also actuated to operate transfer relay 322 over conductor 354. With relays 321 and 322 both operated, the switchboard conductors associated with trunk circuits TC—1 and TC—2 are extended to their home position, leading to key and lamp equipment A1, and to the operator's telephone OT—A.

With all the transfer relays actuated as above pointed out, each of the operators at the four positions A to D receives only those calls incoming over the respective trunk groups Nos. 2 to 5 for the one of the credit files CF—1 to CF—4, Figure 4, which is located directly in front of the operator. The four operators are thus able to work, each in her own portion of the complete file and to work with great efficiency because of the reduced size of the file portion through which she has to look for information, which arrangement is made possible by the disclosed arrangement for selectively directing the calls over the respective trunk groups corresponding to the credit files containing the desired credit information.

*Two positions attended*

As previously mentioned, it is necessary to have all positions of the switchboard 400, Figure 4, attended only when the credit information traffic is heavy, such as on sale days and other times of great activity in the store. At other times, in the particular type of installation being depicted, it has been found that it suffices to employ only two operators. Assuming that such is now the case, the two operators employed are located a positions B and C. The operator at position C then takes care of calls incoming for credit information contained in files CF—3 and CF—4, while the operator at position B takes care of calls for credit information contained in files CF—1 and CF—2. At this time, key 329 at position C and key 326 at position B are preferably restored permitting transfer relays 332 and 322 to restore. The transfer-control keys 330 and 331 are maintained operated to maintain transfer relays 325 and 322 operated. Under this condition, calls arriving at group-2 trunk circuits TC—1 and TC—2 are extended, through contacts of the actuated transfer relay 321, through contacts of the restored transfer relay 322, and by way of cable 323, to the operator's telephone OT—B and equipment B—2 at position B; calls arriving at group-3 trunk circuits TC—3 and TC—4 are extended, through contacts of the restored transfer relay 325, to the operator's telephone OT—B and the equipment B1, also at position B; calls arriving over the group-2 trunk circuits TC—5 and TC—6 come in at the operator's telephone OT—C and equipment C1; while calls arriving over the group-5 trunk circuits TC—7 and TC—8 are extended through contacts of the now restored transfer relay 322, and by way of cable 328, to the operator's telephone OT—C and the equipment C2.

The grouping of the trunk circuits according to the grouping of the information files is of undiminished utility under the present assumed conditions for the operator at position C, for example, knows when a call comes in on one of the trunk circuits TC—5 and TC—6 (indicated by the lighting of the concerned one of the call lamps 309 and 311) that the call is for information contained in the credit file CF—3, in front of the operator when she sits at position C. The operator can immediately prepare herself to secure information from credit file CF—3, meanwhile answering the call by a momentary manipulation of the concerned one of the keys K1 and K2 to answer position. On the other hand, if the call arrives at position C over either of the trunk circuits TC—7 and TC—8, for information contained in the credit file CF—4, the operator at position C is immediately apprised of this fact by the lighting of one or the other of the call lamps in equipment C2, and she can prepare herself to secure the information from file CF—4, while answering the call by momentarily throwing the concerned one of the keys K3 and K4 to answer position.

In a similar way, the operator at position B knows which of the two files CF—1 and CF—2, of Figure 4, contains the desired information, according to whether a call lamp is lighted in equipment group B1 or in equipment group B2, and is thus enabled to position herself in front of the concerned file, while manipulating the answer key and before, or while, conversing with the calling clerk.

*Only one position attended*

Let it be assumed now that the traffic incoming to the credit switchboard is sufficiently light that it can be handled by a single operator. Under this condition, all of the transfer keys (329, 330, and 331) at position C are restored, resulting in transfer relays 332, 325, and 321, at positions D, B, and A, respectively, being in restored condition. Therefore, all calls come in at position C, for the restored transfer relay 321 extends the switchboard conductors of trunk circuits TC—1 and TC—2 by way of cable 324 to the operator's telephone OT—C and equipment C4; the restored transfer relay 325 extends the switchboard conductors of trunk circuits TC—3 and TC—4 by way of cable 327 to operator's telephone OT—C and equipment C3; and the restored transfer relay 322 extends the switchboard conductors of trunk circuit TC—7 and TC—8 through cable 328 to the operator's telephone OT—C and equipment C2.

The operator at position C knows, according to whether a call lamp becomes lighted in equipment group C4, C3, C1 or C2 that the information desired is contained in file CF—1, CF—2, CF—3, or CF—4, and she can thus answer the call by momentarily throwing the concerned one of the keys to answer position and immediately proceed to the one of the files CF—1 to CF—4 which contains the desired information. The operator is thus positioned in front of the called information file by the time she converses with the clerk, and is enabled thereby to operate much more efficiently than would be the case if she would learn first from the conversation with the clerk which of the sections of the complete file contained the information.

*Credit calls from the branch store*

The way in which credit calls are made from the branch store BS (Figure 5) to the credit switchboard in the main store MS will now be explained.

As indicated in Figure 5, a group of trunks is provided for extending connections from the branch store to the main store. Three such trunks, T1 to T3 are indicated in Figure 5 although a larger or smaller number may be used, depending upon the expected extent of the credit traffic. One of the trunks indicated in Figure 5 is the two-conductor one-way trunk T1, extending from the repeater R, Figure 1, in the branch store to the line circuit LC—3, Figure 2, in the main store. The repeater R has the finder F1 associated therewith, and it is assumed that each of the other branch-store-to-main-store trunks is similarly equipped.

Figure 1:
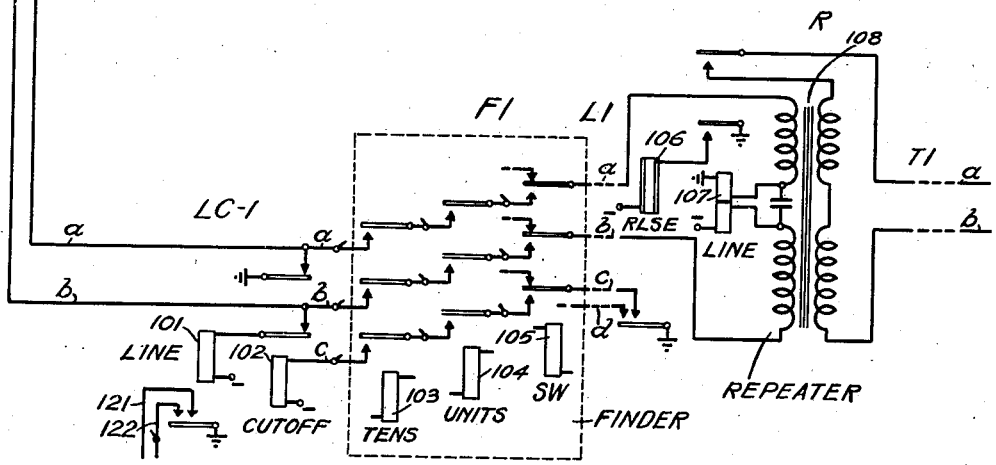

Assuming now that the clerk at the clerk's telephone C1, Figure 1, in the branch store desires credit information, and accordingly removes the receiver at telephone C1, a direct current bridge is thereby closed across the conductors $a$ and $b$ of the associated line to operate line relay 101 of the line circuit LC—1. Upon operating, line relay 101 grounds the individual marking conductor 121 and the common start conductor 122 to mark the line circuit LC—1 and associated line as calling, and to cause the currently allotted finder, the finder F1 for example, to make connection with the calling line, by way of the $a$, $b$, and $c$ leads of the line circuit LC—1.

Meanwhile, the allotter (not shown) provided in common for the finder F and the other similar finders has secured the usual pre-operation of line relay 107 in the repeater R over a local circuit. Line relay 107, upon operating bridges the right-hand windings of the repeating coil 108 across the a and b conductors of the trunk T1 at its upper contacts, while at its inner contacts it operates slow-restoring release relay 106. Relay 106 thereupon grounds the associated c lead and also the associated d, or relay-holding, lead. The grounding of the d lead prepares the usual holding and locking circuits for the relays of the finder F, while the grounding of the c lead prepares the usual circuit for the cutoff relay of the called line.

Connection is made with the calling line by energization of the illustrated tens, units, and units-switching relays 103, 104, and 105 to extend the a, b, and c leads of the line circuit LC—1 through the finder F to the a, b, and c leads respectively of the link L1. This results in the operation of cutoff relay 102 over the extended c lead from ground potential applied thereto at contacts of relay 106. Upon operating, relay 102 disconnects ground potential and the winding of line relay 101 from the a and b conductors, respectively, of the calling line.

The finder allotter is now caused to move away from the illustrated finder link to allot another finder, whereupon the local operating circuit (not shown) of line relay 107 of the repeater R is opened, leaving the line relay operated over the talking conductors of the calling line, now extended through the finder F and the a and b conductors of the link L1 to line relay 107, by way of the left hand windings of repeating coil 108, to maintain release relay 106 operated.

As a result of the above-mentioned closure of the bridge across the conductors of the trunk T1 at the upper contacts of line relay 107, line relay 203 of the line circuit LC—2 in the main store is operated over the trunk T1 to ground the individual marking conductor 233 and the common marking conductor 232 to thereby cause the currently allotted finder, the finder F2 for example, to operate as previously pointed out to extend the trunk T1 to the selector (such as S) associated therewith. When this extension of the connection has been made, the cutoff relay 204 is operated over the extended c lead of the line circuit LC—3 to disconnect ground potential and the winding of line relay 203 from the a and b conductors of the trunk T1, clearing the trunk for the control of the line relay (not shown) of the associated selector.

When the clerk at telephone C1 in the branch store dials the digit constituting the desired credit number (2, 3, 4, or 5, as the case may be) the resulting series of interruptions in the bridge established across the conductors of the calling line at the telephone C1 causes corresponding line relay 107 of the repeater R to restore momentarily a corresponding number of times. Release relay 106, being slow-restoring, remains operated throughout the series of restorations of relay 107.

Each time it restores, line relay 107 opens the bridge across conductors a and b of the trunk T1 at its upper contacts, thereby repeating the interruptions to the line relay (not shown) of the selector in the main store to which the connection has been extended as above pointed out. As the result of the repeated digit impulses, or interruptions, the call is extended by the hereinbefore described selector action to an idle trunk in the called group to thereby bring in a signal at the credit switchboard indicative of the file in which the desired information is located.

The extended call may now be answered as previously pointed out.

When the operator at credit telephone C1, Figure 1, has received the desired information and has replaced her receiver, the restoration of line relay 107 opens the bridge across the conductors of trunk T1 at its upper contacts to thereby permit the extended connection in the main store to clear out in the previously described manner. Line relay 107 also opens the circuit of the associated slow-releasing relay 106, permitting relay 106 to restore after a slight interval, to remove ground potential from the associated c and d leads. Responsive to this operation the actuated relays of the finder F1 restore to clear out the connection, and cutoff relay 102 of the line circuit LC—1 restores to return the line circuit LC—1 to its illustrated normal condition.

With further reference to the trunk groups (trunks 221 to 228) extending to the credit switchboard, it will be understood that the number of trunks in any group can be increased from two, as illustrated, to any number found necessary or desirable. It will be understood also that the complete credit file may comprise a larger or a smaller number than the illustrated four files, CF—1 to CF—4, Figure 4, in which case the number assignment and number of trunk groups may be altered correspondingly.

What is claimed is:

1. In a credit-authorization telephone system, a credit-authorization information file comprising separate file portions, each such file portion containing a separate portion of the total file information, there being separate telephone numbers assigned respectively to the said separate file portions, a separate call-answering operator's equipment group for each of said file portions, clerks' telephones, switching equipment for extending connections selectively from said clerks' telephones to said call-answering operators' equipment groups according to the said assigned numbers, a separate operator's telephone for each of said equipment groups, operator-controlled means in any equipment group for connecting the associated operator's telephone to any connection extended to such equipment group.

2. In a credit-authorization telephone system, an operators' switchboard including a plurality of adjacent credit positions, a credit-authorization information file comprising separate file portions associated respectively with the said positions, each said file portion containing a separate portion of the total file information, there being separate telephone numbers assigned respectively to the said separate file portions, each such telephone number corresponding to a separate group of trunks, each trunk group being effective to store a plurality of contemporaneous calls at the associated position, clerks' telephones, switching equipment for extending connections selectively from said clerks' telephones to said trunk groups according to the said assigned numbers, a separate operator's telephone at each of said positions, and operator-controlled answering means at each position for connecting the associated operator's telephone to any call stored in the associated trunk group.

3. In a credit-authorization telephone system, a credit switchboard having a position thereat arranged to be presided over by a single operator, two credit files accessible to the operator at said position, each of said files containing specifically different credit information, separate telephone numbers assigned to said files respectively, clerk's telephones, switching equipment for extending connections from said clerk's telephones to said operator's position when the telephone number of either of said files is called, means enabling the operator at said position to answer the call over any of said connections, and means actuated in accordance with the telephone number called for informing the operator before she answers the call which of said files is being called.

4. In a credit-authorization telephone system; an operator's answering switchboard having operator's positions thereat located adjacent each other; credit files located in association with said positions, respectively; each of said credit files containing separate specific information and each having a separate telephone number assigned thereto; clerks' telephones; switching means for extending connections selectively from said clerks' telephones according to the said numbers assigned to said files, said connections being extended in each case to the position associated with the file whose telephone number is called, provided all said positions are attended; means effective when only a portion of the positions are attended for diverting the calls which would otherwise arrive at unattended positions into such of said positions as are then attended; and means then effective for indicating to an operator receiving a call at her position whether the call is one which would come into her position under the condition of all said positions being attended or is one which would come into another position if all said positions were attended, and, if so, to what other position.

5. In a credit-authorization system, a credit-authorization switchboard having adjacent positions thereat, each of said positions being provided for the use of a separate operator in answering calls for credit information, each of said positions having a group of signal and switching devices for enabling the operator thereat to answer calls incoming to her position, said operator's switchboard also having credit files mounted thereon, one for each of said positions and associated respectively therewith, there being groups of trunks incoming to said switchboard, a separate group incoming to each position, said trunk groups being associated respectively with the said groups of signal and switching devices, one of said operator's positions being a master position, provided also with additional groups of signal and switching devices, one such additional group for each other said position, and transfer means associated with said switchboard for rendering all said trunks incoming to said master position, in which case the calls received over said trunk groups are received respectively at the said sets of signal and switching equipment at said master position, whereby the operator thereat is aware when answering a call of which trunk group the call arrived over and is thus able to proceed at once to the called one of said information files.

6. In a credit-authorization telephone system, clerks' telephones, a credit-authorization switchboard adapted to enable operators thereat to give credit information to the clerks making calls thereto from said clerks' telephones, trunks incoming to said switchboard, each of said trunks being provided with a trunk circuit including relay equipment, switching means enabling connections to be extended from calling ones of said clerks' telephones to said switchboard by way of said trunks and trunk circuits, a call signal and an answer key at the switchboard for each of said trunks, means in each trunk circuit responsive to the extension of a connection thereover from a clerk's telephone for operating the associated call signal to signal the operator, means also in each trunk circuit responsive to an actuation of the associated answer key for completing the connection to the operator's telephone, and means including a recall relay in the trunk circuit responsive to a further operation of the answer key for sending a recall-tone signal back over the established connection to the calling clerk's telephone to recall the clerk in the event that the clerk has left the telephone to attend to her other duties while waiting for the credit operator to answer.

7. In a credit-authorization telephone system, a main switchboard and a removably located branch switchboard, clerks' telephone lines terminating in the branch switchboard, other clerks' telephone lines terminating in the main switchboard, a credit-authorization operators' switchboard, trunk lines extending to said operators' switchboard from said main switchboard, numerical switching equipment at said main switchboard for extending calling ones of said clerks' telephone lines by way of said trunk lines to said operators' switchboard, trunk lines extending from the branch switchboard to the main switchboard, non-numerical switching equipment at the branch switchboard operable to extend connections over said branch-to-main trunk lines from all calling ones of the clerks' lines terminating at the branch switchboard, said numerical switching equipment at the main switchboard being thereupon operable to further extend the last-named connections to said operator's switchboard, and means including call-answering equipment at said operators' switchboard and including credit-information files having separate telephone numbers assigned thereto and called over said clerks' lines to secure extension of said connections for enabling the operators thereat to give credit information over all said clerks' telephone lines.

8. In a credit-authorization telephone system, two operators' switchboard positions, a credit file having groups of credit information associated respectively with said positions, a separate group of call signals at each position, said groups of call signals corresponding respectively to said groups of file information, clerks' telephones, means controlled from any clerk's telephone for causing a signal at either selected one of said positions to display a call for credit information in the associated group of the credit file, there being means at each position enabling the operator thereat to answer a call displayed at such position, the first of said positions having a further group of call signals corresponding respectively to the signals at the second position, and switching means effective to cause the signals of the last-named group to display at the first position calls for the second position when such second position is unattended.

GLENN KINER.